United States Patent [19]

Fujisawa et al.

[11] Patent Number: 4,785,226
[45] Date of Patent: Nov. 15, 1988

[54] POWDER SUPPLY DEVICE WITH SOLAR CELL

[75] Inventors: Hidetaka Fujisawa; Katsuhiro Wakita, both of Tokyo, Japan

[73] Assignee: Casio Computer Co., Ltd., Tokyo, Japan

[21] Appl. No.: 921,326

[22] Filed: Oct. 17, 1986

[30] Foreign Application Priority Data

Oct. 21, 1985 [JP] Japan .................................. 60-233496

[51] Int. Cl.$^4$ ............................................... H02J 7/00
[52] U.S. Cl. ..................................... 320/21; 323/271; 323/906; 136/293
[58] Field of Search ................. 320/20, 21; 323/271, 323/906; 136/293

[56] References Cited

U.S. PATENT DOCUMENTS 3,419,779 12/1968 Zehner ...................................... 320/6
4,136,309 1/1979 Galberth et al. ......................... 320/2

FOREIGN PATENT DOCUMENTS 52-19105 5/1977 Japan .

Primary Examiner—Patrick R. Salce
Assistant Examiner—Anita M. Ault
Attorney, Agent, or Firm—Frishauf, Holtz, Goodman & Woodward

[57] ABSTRACT

A powder supply device with a solar cell is made up of a solar cell, a seconary battery, and a voltage control unit. The voltage control unit controls the output voltage of the solar cell, and produces first and second output voltages. The first output voltage is for charging the secondary battery. The second output voltage is for driving a circuit, such as the logic circuit of an electronic calculator.

7 Claims, 4 Drawing Sheets

POWDER SUPPLY DEVICE WITH SOLAR CELL

BACKGROUND OF THE INVENTION

This invention relates to a power supply device with a solar cell, which is used mainly for small electronic calculators.

The conventional small electronic calculator, such as the desk-top type, has generally used a primary battery, such as the dry cell type, for its power supply. More recently, however, solar cells have begun to be widely used for the same purposes.

In the case of those calculators using a primary battery, when the battery's power has been consumed, the battery must then be replaced with a new one. Battery replacement tends to be troublesome and is also uneconomical. A calculator using a solar cell tends to be inoperative in some places where the ambient light level is reduced even slightly; for example, in a room.

SUMMARY OF THE INVENTION

Accordingly, an object of this invention is to provide a power supply device which is suitable in use for small electronic devices such as calculators, which dispenses with the need to replace a battery, and which is operative even in a dark place.

To achieve the above object, there is provided a power supply device with a solar cell, comprised of a solar cell, a secondary battery, and a voltage control means for obtaining a first output voltage for charging the secondary battery and a second output voltage equal to the rated voltage of a circuit means.

With such an arrangement, the power supply device charges the secondary battery, while supplying the power voltage to the circuit means, when in a well-lighted place. In a dark place, the device supplies the power voltage to the circuit means, from the secondary battery. The power supply device of this invention is free from the need to replace the battery, thereby allowing permanent use. In this respect, the device is very economical. Further, the power supply device can be used anywhere, regardless of the degree of darkness and brightness. Even if there is a difference between the charge voltage for the secondary battery and the rated voltage of the circuit means, an appropriate voltage supply is possible. Therefore, the secondary battery and the circuit means can be flexibly selected, thus providing versatility in practical use.

DETAILED DESCRIPTION OF THE PREFERRED EMBODIMENTS

An embodiment of a power supply device according to this invention will now be described, with reference to the accompanying drawings.

Figure 1:
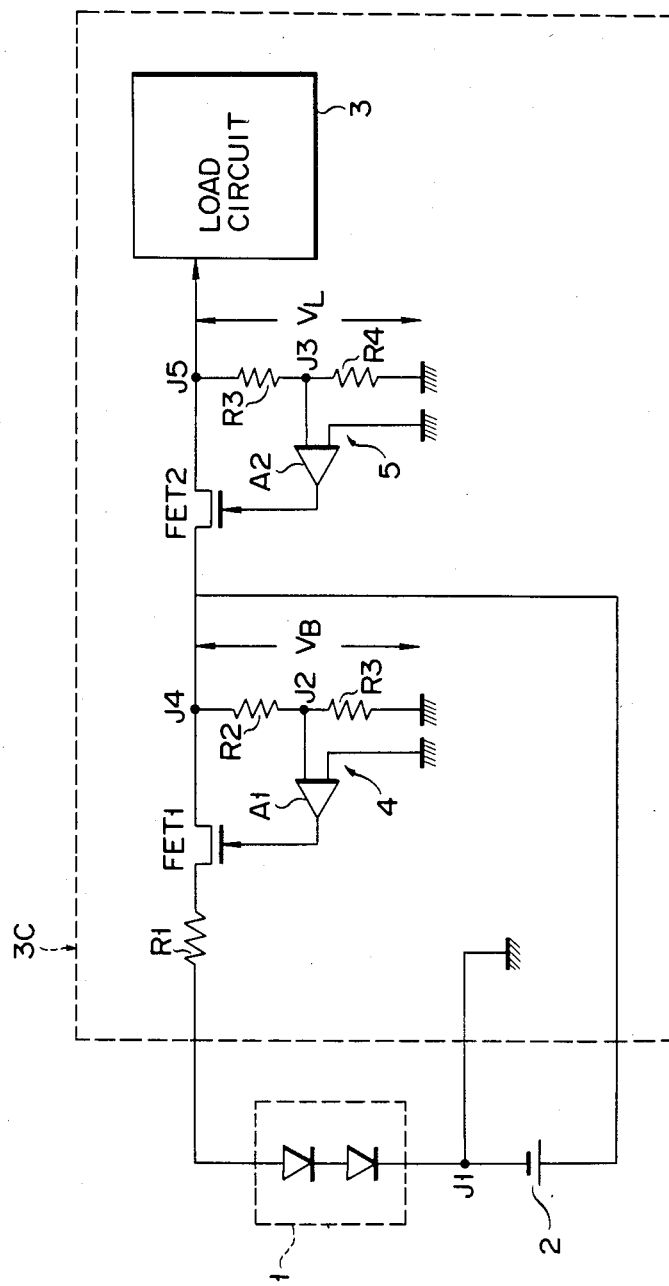
FIG. 1 is a circuit diagram illustrating a power supply device using a solar cell, according to a first embodiment of this invention.

FIG. 1 is a circuit diagram illustrating a power supply device using a solar cell, according to a first embodiment of this invention. In this figure, numeral 1 designates a solar cell, and 2 is a secondary battery which is chargeable. Numeral 3 represents a load circuit, such as a logic circuit of a calculator. Numeral 4 denotes a first stage regulator to be described later. Regulator 4 has a function to regulate the output signal of solar cell 1, in order to charge secondary battery 2. Second stage regulator 5, to be described later, regulates the output voltages of secondary battery 2 and first regulator 4, to drive load circuit 3. Numeral 3c represents an LSI chip. As can be seen from this figure, LSI chip 3c contains all the elements of a power supply circuit, except solar cell 1 and seoondary battery 2 as power sources.

The power supply device will now be described in detail. Node J1, which is situated between the negative terminals of solar cell 1 and secondary battery 2, is grounded. The positive terminal of secondary battery 2 is connected to connection point J4, which is connected to the drain of field effect transistor (FET) 1. FET 1 is one of the elements of first stage regulator 4. The source of FET 1 is connected to the positive terminal of solar cell 1, via restrictive resistor R1. First stage regulator 4 has a voltage divider as a voltage detector element for charge voltage $V_B$, which is for charging secondary battery 2 of 1.8 V, for example. The voltage divider includes a resistor series circuit made up of resistors R2 and R3. The series circuit is connected at one end to node J4, and at the other end to ground. Node (or mid-connecting point) J2 is coupled with the voltage, which is proportional to the charge voltage for the secondary battery. Operational amplifier A1 is an amplifier, which converts the detected voltage to a signal, which is suitable for the FET 1 control. The input terminal of amplifier A1 is coupled to the detected voltage from mid-connecting point J2. The reference input terminal of amplifier A1 is coupled to the reference potential, via the ground. The output signal of operational amplifier A1 is applied to the gate of FET 1. By way of the applied signal, the conductivity of FET 1 is controlled in accordance with the amplitude of the detected voltage.

Second regulator 5 has the same circuit arrangement as first stage regulator 4. More particularly, the voltage divider, made up of resistors R3 and R4, determines the supplied voltage to load circuit 3; i.e., load voltage $V_L$ of 1.5 V, for example. One end of the voltage divider is coupled to node J5, which is connected to the drain of FET (field effect transistor) 2. The other end of the voltage divider is grounded. The source electrode of FET 2 is coupled to node J4, which has a potential equal to that of the positive terminal of secondary battery 2. Node J3, as the mid connection point in the voltage divider, provides the detected voltage of load circuit 3. Node J3 is connected to the input terminal of operational amplifier A2, while the reference input terminal of operational amplifier A2 is connected to ground. The output signal of operational amplifier A2 is connected to the gate electrode of FET 2. By way of this signal, the conductivity of FET 2 is controlled, so as to stabilize the detected voltage or load voltage $V_L$.

The operation of the power supply device thus arranged will now be described.

Solar cell 1 receives radiation energy, such as sun rays, and its electromotive force becomes greater than the charge voltage (1.8 V, for example) of secondary battery 2. At this time, first stage regulator 4 drives operational amplifier A1, which in turn applies, to the gate of FET 1, the signal for decreasing the conductivity of FET 1. With this signal applied, the output voltage $V_B$ of FET 1 is controlled, so that the output voltage $V_B$ of regulator 4, for regulating the output voltage of solar cell 1, is controlled to be the charge voltage of secondary battery 2. Output voltage $V_B$, to be supplied to node J4, is thus stabilized. Through a similar operation, second stage regulator 5 decreases (or increases) the conductivity of FET 2 for the rise (or drop) of load voltage $V_L$, which is applied to node J5. In this way, the output voltage from first stage regulator 4 and that of secondary battery 2 are regulated, thereby stabilizing load voltage $V_L$.

As can be seen from the foregoing, by changing the dividing voltage (or resistance) ratio of the detect element in the regulator, the operating range of the FET, which functions as a variable impedance or voltage-adjusting switch, can be varied. This implies that, by appropriately selecting the dividing voltage ratio, the problem of the difference between the charge voltage of secondary battery 2 and the rated voltage of load circuit 3, can be solved.

Figure 2:
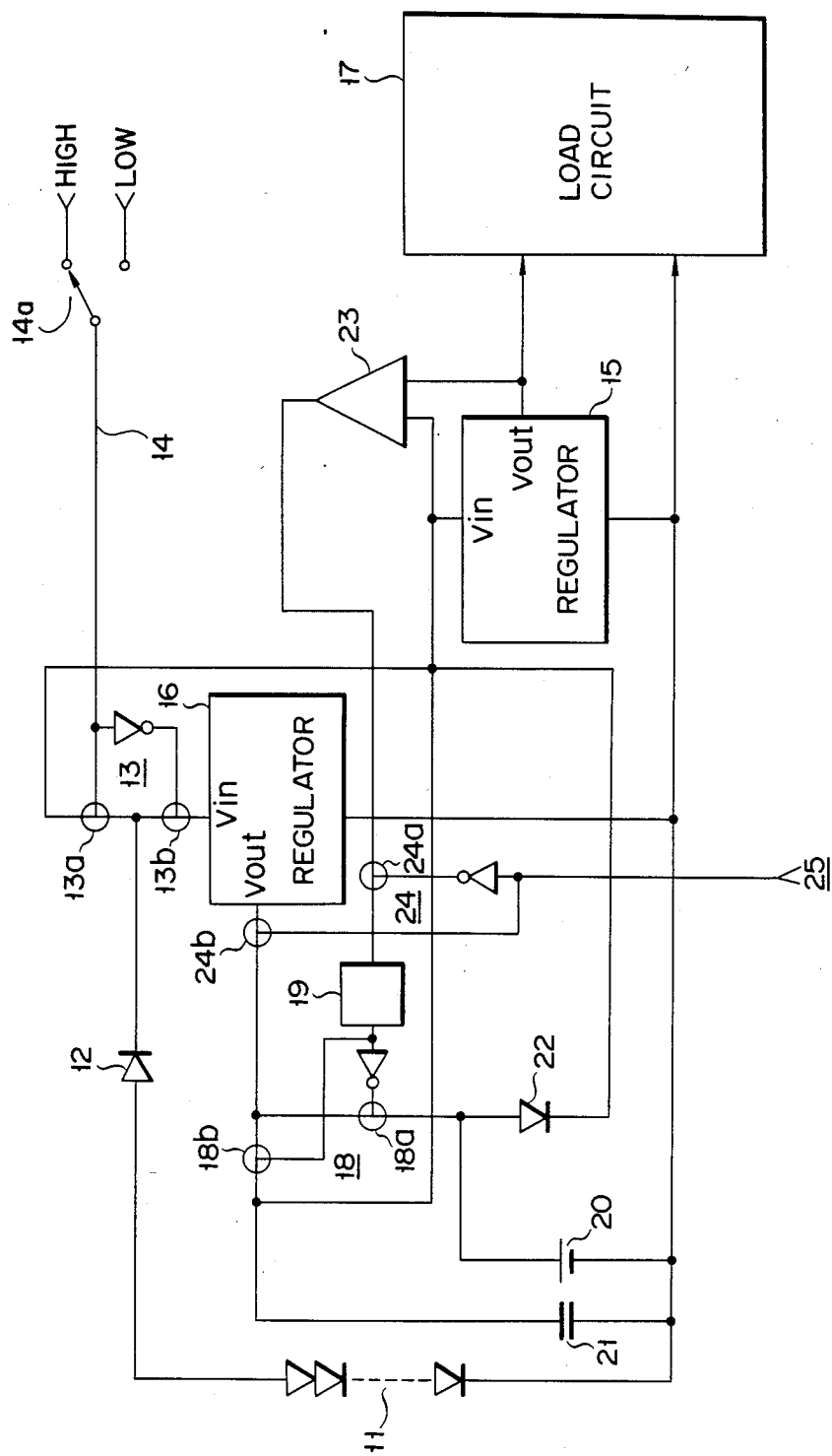
FIG. 2 is a circuit diagram illustrating a power supply device using a solar cell, according to a second embodiment of this invention.

FIG. 2 is a circuit arrangement illustrating a second embodiment of a power supply device according to this invention. In this figure, the output voltage of solar cell 11 is applied to transfer gate 13, via reverse current-prevention diode 12. Gate 13 includes gates 13a and 13b. Gate 13a is enabled when power switch control signal 14 is at H-(high) level. Gate 13b is enabled when signal 14 is at L-(low) level. The H-, and L-levels of signal 14 correspond respectively to the ON and OFF states of a power switch 14a. The output of solar cell 11 is applied to regulator 15 when gate 13a is enabled, and is applied to regulator 16 when gate 13b is enabled. Regulator 15 produces the rated value of 1.5 V of load circuit 17. The output voltage is applied to load circuit 17. Regulator 16 produces the charge voltage of 1.8 V for the secondary battery 20. The output voltage of regulator 16 is applied to transfer gate 18. Gate 18 includes gates 18a and 18b, which are controlled in a complementary manner by the output signal of flip-flop 19. The output voltage of regulator 16 is connected to secondary battery 20 via gate 18a, and to back-up capacitor 21 via gate 18b. AgO, GC, and Carbon Li may be used for secondary battery 20.

The output voltage of secondary battery 20 is coupled to regulator 15, via reverse current-prevention diode 22. The input and output voltages of regulator 15 are applied to comparator 23. Comparator 23 produces an H-(high) level signal when the difference between the input and output voltages of regulator 15 becomes larger than a set value, or when the input voltage is below 1.7 V. With other voltage differences, it keeps its output level at L-(low) level.

The output signal of comparator 23 is transferred to transfer gate 24. Gate 24 is made up of gates 24a and 24b which are controlled in a complementary manner by control signal 25, which is pulsating at fixed intervals. The output signal of comparator 23 is sent to flip-flop 19, via gate 24a. The output siqnal of regulator 16 is transferred to transfer gate 18, via gate 24b.

The operation of the second embodiment thus arranged, will now be described.

When the power switch 14a *is in the ON state, with power supply being used, a power switch control signal 14 is H-(high) level. By way of this signal, gate 13a of transfer gate 13 is enabled. Then, the output voltage of solar cell 11 is applied to regulator 15, via diode 12 and gate 13a.

At the same time, the output voltage of secondary battery 20 is applied to regulator 15, via diode 22. Accordingly, in this state, the output voltage of either the solar cell 11 or the secondary battery 20, whichever has the higher potential, is selected, and is applied to regulator 15. The rated voltage of 1.5 V produced by regulator 15, is supplied to load circuit 17. When the output voltage of the solar cell 11 is lower than that of secondary battery 20, diode 12 operates to prevent a reverse current. Conversely, when the output voltage of the secondary battery is lower than that of the solar cell, diode 22 operates to prevent a reverse current.

Next, when the power switch 14a is in the OFF state, the L-(low) level output of the power switch control signal 14 causes gate 13b of transfer gate 13 to be enabled. The input voltage of solar cell 11, in turn, is supplied to regulator 16, via diode 12 and gate 13b.

At the same time, a fixed-interval-pulsative control signal 25 is applied to transfer gate 24. Gates 24a and 24b are alternately enabled, in a complementary fashion. In this instance, the duration of a H-level signal portion of control signal 25 is set longer than that of a L-level signal portion. Therefore, the enabled duration of gate 24b is longer than that of gate 24a. Supposing that the output signal of flip-flop 19 is at low level, gate 18a of transfer gate 18 is enabled. The output signal of 1.8 V from regulator 16 is supplied to secondary battery 20 only during the period when gate 24b of transfer gate 24 is enabled. As a result, secondary battery 20 is charged. In this instance, gate 18b of transfer gate 18 is not enabled since the output of flip-flop 19 remains at low level, and therefore, capacitor 21 will never be charged.

Control signal 25 is at L-(low) level, gate 24a of transfer gate 24 is enabled and gate 24b is disabled. Under this condition, the output voltage of either secondary battery 20 or capacitor 21, whichever has the higher potential, is supplied to regulator 15 and to one of the terminals of comparator 23. Upon receipt of this signal, comparator 23 compares the input and output voltages of regulator 15. When the difference between these two voltages is above a set value, that is to say, when the potentials across secondary battery 20 and capacitor 21 are both below 1.7 V, comparator 23 produces an H-(high) level output signal. Under this condition, the H-level output signal of comparator 23 is supplied to flip-flop 19, so that the output of flip-flop 19 becomes H-(high) level. Then, gate 18b of transfer gate 18 is enabled. Control signal 25 again becomes H-(high) level, and gate 24b of transfer gate 24 is enabled. Then, the output of regulator 16 is supplied to capacitor 21, and capacitor 21 is charged.

The volt-ampere of capacitor 21 is so small, compared with that of secondary battery 20, that it can be charged in a relatively short time. With this charge, the voltage across its terminals rises to 1.7 V, for example, and control signal 25 become L-(low) level. By means of the output of capacitor 21, the difference between the input and output voltages compared by comparator 23, is below a set value, and the output of comparator 23 is L-(low) level again.

As a result, the L-level output of comparator 23 is supplied to flip-flop 19, and the output of flip-flop 19 is again L-(low) level. Then, gate 18a of transfer gate 18 is enabled again. Control signal 25 is H-(high) level, and gate 24b of tranefer gate 24 is enabled. Upon enabling of gate 24b, the output of the regulator is supplied to secondary battery 20, and secondary battery 20 is charged.

In this instance, gate 18b of transfer gate 18 is again disabled and the charging of capacitor 21 is stopped.

As is described above, in this embodiment, when the power switch 14a is turned off, capacitor 21, which can be charged to a predetermined potential in a relatively short time, is charged. During the period that capacitor 21 has a sufficient potential, secondary battery 20 is charged. Therefore, even when the amount of light to solar cell 11 is reduced, the memory in load circuit 17 can be backed up by using the output voltage of capacitor 21. With the above features, secondary battery 20 can be charged efficiently, to provide the most effective use of the battery.

Subsequently, when the power switch 14a is turned on, the output voltage of either solar cell 11 or secondary battery 20, whichever has the higher potential, is output to regulator 15. The output voltage from regulator 15 is supplied to load circuit 17. This device executes its power supply function. When the power switch is turned off, the output of the solar cell 11 is supplied to regulator 16. The output voltage of regulator 16 is supplied to secondary battery 20, which is charged thereby.

As is described above, when the device is used for power supply, the output of either solar cell 11 or secondary battery 20, whichever has the higher potential, is regulated and supplied to load circuit 17. This makes it possible to drive the load circuit by the rated voltage, at all times. Furthermore, even if secondary battery 20 is not charged, power supply is still possible, by means of the output of solar cell 11. Stabilized power is always supplied to load circuit 17. Therefore, this power supply device is most suitable as a power supply for electronic devices such as electronic calculators, which are used mainly in situations where normal room lighting is available, and the charging of secondary battery 20 is not performed up to a predetermined level.

As is described above, when the power supply device is not in use, secondary battery 20 is charged effectively by the output of solar cell 11. In this case, capacitor 21 is charged prior to secondary battery 20. Even if the secondary battery is not charged adequately, and the power supply device must be used, capacitor 21 can back up solar cell 11. This feature assures the stable operation of the apparatus coupled with this device.

Figure 3:
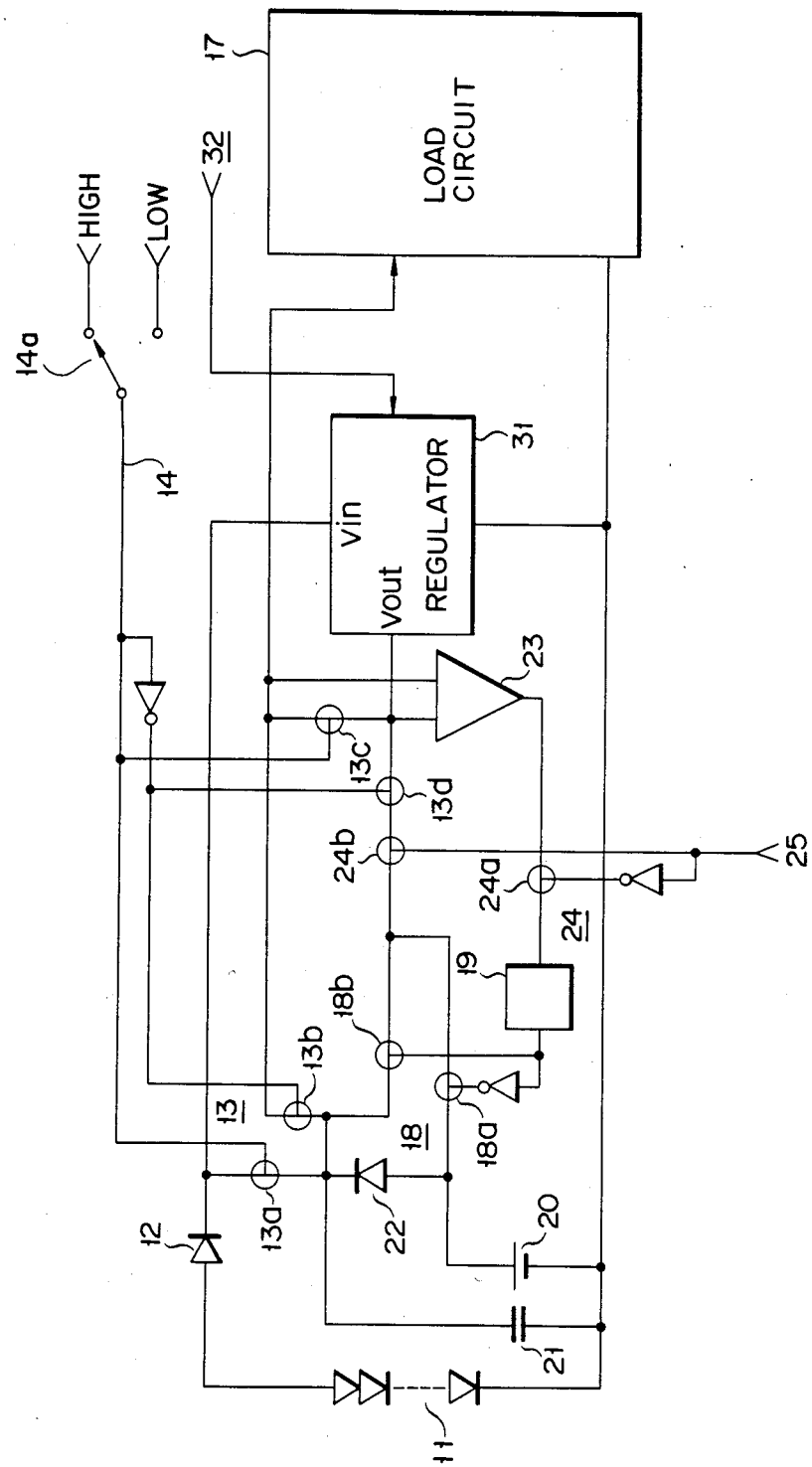
FIG. 3 is a circuit diagram illustrating a power supply device using a solar cell, according to a third embodiment of this invention.

FIG. 3 is a circuit diagram illustrating a third embodiment of a power supply device according to this invention. The portions which differ from those in the second embodiment will be described.

Figure 4:
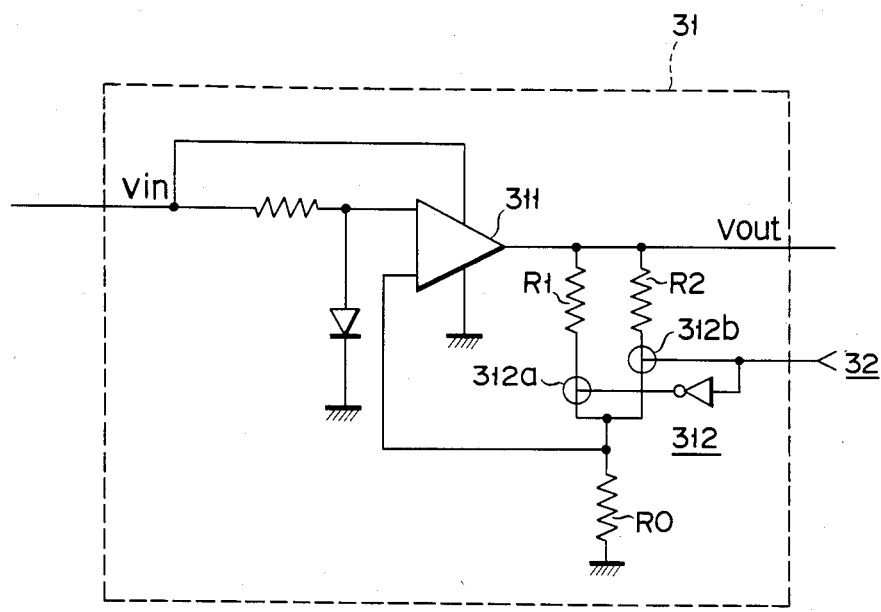
FIG. 4 is a circuit diagram illustrating a regulator used in the third embodiment.

Regulator 31 is supplied with an L-(low) level signal 32 as a regulator control signal 32, to the rated voltage of load circuit 17, when the power switch 14a is in the ON state. When the power switch is off, regulator 31 is supplied with an H-(high) level signal as regulator control signal 32, and outputs a discharge voltage for the secondary battery 20. More specifically, as shown in FIG. 4 the power supply device contains operational amplifier 311, transfer gate 312, and output-voltage-adjusting resistors R0, R1, and R2. When supplied with an L-(low) level signal as a regulator control signal 32, gate 312a of transfer gate 312 is enabled, and the rated output voltage of the load circuit is output by the combination of resistors R1 and R0. When supplied with an H-(high) level signal as regulator control signal 32, gate 312b of transfer gate 312 is enabled, and the charge voltage for the secondary battery 20, is output. Transfer gate 13 is made up of gate, gate 13c which is operated in synchronism with gate 13a, and gate 13d which is operated in synchronism with gate 13b. The remaining portions of this embodiment are the same as those in FIG. 2. The portions corresponding to those in FIG. 2 are designated by the same numerals as in FIG. 2, respectively.

In this embodiment also, when the power switch 14a is in the ON state, the output voltage of solar cell 11 appears via diode 12, and that of secondary battery 20 appears via diode 22 and gate 13a. The output voltage of either of these two batteries, whichever is the higher, is transferred to regulator 31. By means of this voltage, regulator 31 supplies the rated voltage of 1.5 V to load circuit 17, via gate 13c.

When the power switch 14a is turned off, the output voltage of solar cell 11 is supplied to regulator 31. The output signal of regulator 31 is applied to secondary battery 20 via gates 13d, 24b, and 18a, so that secondary battery 20 is charged. However, when the difference between the input and output voltages of regulator 31 is above a predetermined level, that is to say, when the input voltage of regulator 31 is less than 1.7 V, comparator 23 produces an H-(high) level signal, and the output of flip-flop 19 is H-(high) level. As a result, the output voltage of regulator 31 is supplied to capacitor 21 via gates 13d, 24b, and 18b. When capacitor 21 is charged up to a predetermined voltage, the output of comparator 23 is L-(low) level, and the output of flip-flop 19 is also L-(low) level. The output voltage of regulator 31 is again supplied to secondary battery 20, via gates 13d, 24b, and 18a.

With such an arrangement, this embodiment has also the same effects as the second embodiment. Further, an optimum rated voltage for load circuit 17 and the charged voltage for the secondary battery can be obtained by means of a single regulator. With these features, miniaturization of the power supply device and reduction of cost can be achieved.

It should be understood that this invention is not limited to the above embodiments, and thus can be variously changed and modified within the scope of the invention. For example, the power supply control circuit composed of a regulator, reverse current-preventing diodes, and transfer gates, may be either contained in the LSI or mounted outside the LSI. The secondary battery may be replaced by a large-capacity capacitor. Furthermore, if the load circuit is of a low power-consuming type, transfer gate 13 can be omitted, and the output voltage of solar cell 11, supplied via diode 12, can be directly transferred to regulator 16. Additionally, gate 13a can always be set in the enabled state by controlling transfer gate 13 by means of the ROM or master slice. If so, this power supply device can be applied in the same LSI, for the solar drive system, the battery drive system, or the solar cell-primary battery drive system.

What is claimed is:

1. A power supply device with a solar cell, comprising:
   a solar cell having an associated output;
   a secondary battery;
   first means for controlling the output of said solar cell and for producing a first output voltage for charging said secondary battery;
   second means for controlling said first output voltage produced by said first means and an output of said secondary battery, and for producing a second output voltage that is lower than said first output voltage for driving a load circuit;

means for connecting said first means to said secondary battery; and means for connecting said secondary battery to said second means;

wherein said second means includes means for producing said second output voltage by controlling said first output voltage when the output of said solar cell is higher than said first output voltage, and for producing said second output voltage by controlling the output of said secondary battery when the output of said solar cell is lower than said first output voltage.

2. The power supply device according to claim 1, wherein said first means and said second means are regulators for regulating an input voltage from which is set a predetermined voltage.

3. The power supply device according to claim 2, wherein said regulator includes a field effect transistor for controlling the input voltage, and an operational amplifier for controlling the conductivity of the field effect transistor in accordance with an output voltage of the field effect transistor.

4. A power supply device with a solar cell, comprising:

a solar cell having an associated output;

a secondary battery;

first means for controlling the output of said solar cell and for producing a first output voltage for charging said secondary battery;

second means for controlling the ouput of said solar cell and an output of said secondary battery, and for producing a second output voltage for driving a load circuit;

a power switch;

means for connecting said solar cell to said first means when said power switch is in an OFF state;

means for connecting said solar cell to said second means when said power switch is in an ON state;

means for connecting said first means to said secondary battery;

means for connecting said secondary battery to said second means; and means for connecting said second means to said load circuit;

wherein said second means includes means for producing said second output by controlling the output of said solar cell when the output of said solar cell is higher than the output of said secondary battery, and for producing said second output voltage by controlling the output of said secondary battery when the output of said secondary battery is higher than the output of said solar cell.

5. The power supply device according to claim 4, wherein said first means and said second means are regulators for regulating an input voltage from which is set a predetermined voltage.

6. A power supply device with a solar cell, comprising:

a solar cell having an assoicated output;

a secondary battery;

a power switch;

controlling means for controlling the output of said solar cell and for producing a first output voltage for charing said secondary battery when said power switch is in an OFF state, and for producing a second output voltage for driving a load circuit when said power switch is in an ON state;

first means for connecting said solar cell to said controlling means;

second means for connecting said controlling means to said load circuit when said power switch is in the ON state;

third means for connecting said controlling means to said secondary battery for charging said secondary battery with output of said solar cell when said power switch is in the OFF state; and fourth means for connecting said secondary battery to said controlling means for supplying a discharge ouput to said load circuit when said power switch is in the ON state;

wherein said controlling means includes means for producing said second output voltage by controlling the output of said solar cell when the output of said solar cell is higher than the output of said secondary battery, and for producing said second output voltage by controlling the output of said secondary battery when the output of said secondary battery is higher than the output of said solar cell.

7. The power supply device according to claim 6, wherein said controlling means is a controlled regulator for regulating an input voltage from which is set one of two different predetermined voltages in accordance with the level of a regulator control signal.

* * * * *